US009213765B2

(12) United States Patent
Wong et al.

(10) Patent No.: US 9,213,765 B2
(45) Date of Patent: *Dec. 15, 2015

(54) LANDING PAGE SEARCH RESULTS

(71) Applicant: Amazon Technologies, Inc., Reno, NV (US)

(72) Inventors: Douglas Tak-Lai Wong, Seattle, WA (US); Vivekanand Kirubanandan, Seattle, WA (US); Blair L. Hotchkies, Bellevue, WA (US); Subramanya R. Bhat, Newcastle, WA (US); Jason P. Patrikios, Seattle, WA (US); Paul Daniel Jaye, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,108

(22) Filed: Jun. 9, 2014

(65) Prior Publication Data

US 2014/0289214 A1 Sep. 25, 2014

Related U.S. Application Data

(63) Continuation of application No. 12/645,178, filed on Dec. 22, 2009, now Pat. No. 8,751,516.

(51) Int. Cl.
G06F 7/00 (2006.01)
G06F 17/30 (2006.01)

(52) U.S. Cl.
CPC .... *G06F 17/30864* (2013.01); *G06F 17/30696* (2013.01)

(58) Field of Classification Search
None
See application file for complete search history.

(56) References Cited

U.S. PATENT DOCUMENTS

| 7,634,466 | B2 * | 12/2009 | Rose et al. .............................. 1/1 |
| 8,019,746 | B2 | 9/2011 | Liu |
| 2004/0122808 | A1 | 6/2004 | Martin et al. |
| 2005/0149500 | A1 * | 7/2005 | Marmaros et al. ................ 707/3 |
| 2006/0288001 | A1 | 12/2006 | Costa et al. |
| 2007/0192289 | A1 | 8/2007 | Lin |
| 2007/0239676 | A1 | 10/2007 | Stonehocker et al. |
| 2007/0255744 | A1 * | 11/2007 | Gideoni et al. ............... 707/102 |
| 2008/0082512 | A1 * | 4/2008 | Hogan et al. ....................... 707/3 |
| 2008/0215416 | A1 * | 9/2008 | Ismalon ......................... 705/10 |
| 2009/0076886 | A1 * | 3/2009 | Dulitz et al. .................... 705/10 |
| 2009/0307188 | A1 * | 12/2009 | Oldham et al. .................. 707/3 |
| 2010/0017388 | A1 | 1/2010 | Glover |
| 2010/0057709 | A1 | 3/2010 | Kawanaka et al. |
| 2010/0106701 | A1 | 4/2010 | Ducatel et al. |
| 2010/0161605 | A1 | 6/2010 | Gabrilovich et al. |
| 2010/0241515 | A1 | 9/2010 | Katti |
| 2010/0250336 | A1 * | 9/2010 | Selinger et al. ................ 705/10 |
| 2011/0016108 | A1 | 1/2011 | Pelenur et al. |
| 2011/0035367 | A1 | 2/2011 | Gupta et al. |

* cited by examiner

*Primary Examiner* — Robert Beausoliel, Jr.
*Assistant Examiner* — Michael Pham
(74) *Attorney, Agent, or Firm* — Hogan Lovells US LLP

(57) ABSTRACT

Systems and methods for providing content are disclosed. In an embodiment, information encoding at least one keyword that is associated with first content accessed by a user is received. A search query based at least in part on at least one keyword is executed to identify items. In response to a request from the user to access second content, a response is generated to the request that includes item information associated with at least a subset of the identified items. The response is provided to the user.

20 Claims, 7 Drawing Sheets

LANDING PAGE SEARCH RESULTS

CROSS REFERENCE TO RELATED APPLICATION

This application is a continuation of allowed U.S. patent application Ser. No. 12/645,178, filed Dec. 22, 2009, which is hereby incorporated herein by reference for all purposes.

BACKGROUND

Search engines are powerful tools for locating information in a variety of contexts. For instance, a consumer seeking to purchase a particular product may enter one or more words, also known as keywords, describing the product, into an interface of a search engine in order to locate information about the product and/or purchase the product. The search engine may then provide the consumer with search results determined, based at least in part on the keywords entered, to be relevant and the consumer may search through the search results in order to locate what the consumer was looking for. The search results are provided to the consumer in a list or similar format, with each result displaying some amount of information. If the consumer finds a search result that appears to be relevant to what he or she was looking for, the consumer may select the result in order to navigate to a landing page to receive more information and/or perform other actions, such as purchasing a product offered at the landing page.

While search engines employ various methods for increasing the relevance of search results provided to people searching, the information sought by a searcher is often not presented prominently and sometimes not presented at all. This may be due to various reasons. If a search query entered by a consumer is too broad, there may be many results that match the query. For instance, if a consumer desires to purchase a particular model of digital camera and enters the name of the manufacturer's name and "digital camera" as a search query to a search engine, the search engine may not prominently display any results related to the particular model sought if the manufacturer produces numerous models. Other factors influencing whether relevant results are presented to a consumer are the quality of any algorithms used by the search engine, the time the information sought became available, the number of pages with similar information, and the like.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
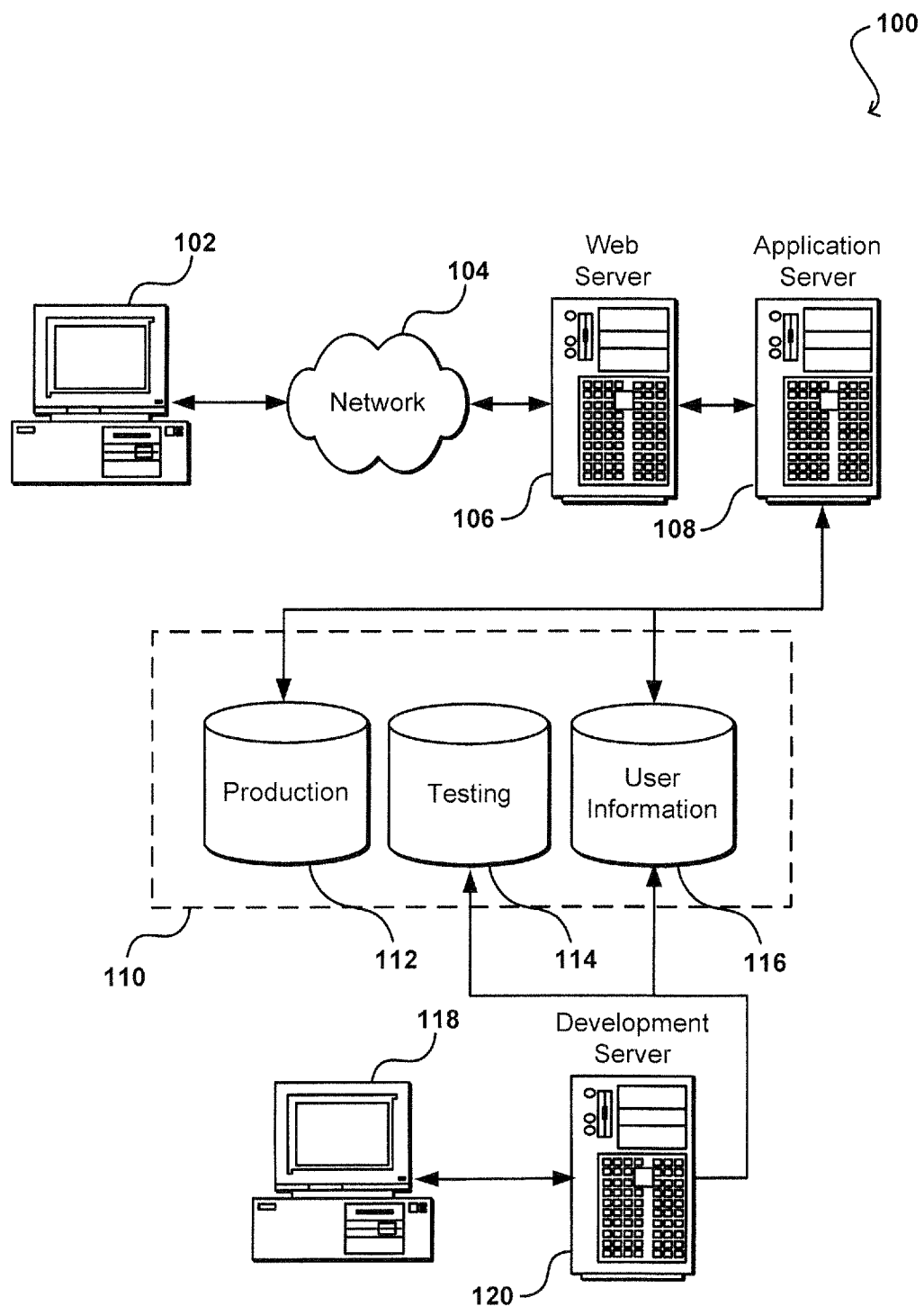
FIG. 1 illustrates an environment in which various embodiments can be implemented.

Systems and methods in accordance with various embodiments of the present disclosure may overcome one or more of the aforementioned and other deficiencies experienced in providing information sought by users, such as consumers viewing information provided via an electronic marketplace. In particular, systems and methods in accordance with various embodiments provide an automated approach to providing relevant information to consumers. In an example where a consumer enters a search query into a search engine, search results additional to those provided by the search engine may be provided on a landing page of one or more of the search results provided by the search engine. In various embodiments, when the consumer selects search results in order to navigate to a corresponding landing page, the search query entered by the consumer is entered as a search query to another search engine and one or more search results provided by the other search engine are included in the landing page. The other search engine may be a search engine operable to provide results dedicated or substantially dedicated to providing items that may be consumed by the consumer. For instance, the other search engine may provide search results related to products that may be purchased by consumers in an electronic environment, such as through a web page. Generally, the search engine may be dedicated to any items that may be consumed, which may include consumer products that may be purchased, leased, or rented, services that may be ordered, digital content that may be viewed and/or downloaded, and the like. The items for consumption may be consumed by consumers in exchange for consideration, such as money or other value, or may be provided free of charge.

In various embodiments, one or more methods for selecting search results to be included in a landing page may be used. For example, various information may be used in order to filter results that should not be shown on the landing page. As an example, if the landing page is primarily directed to a particular item, any search results corresponding to that item may be excluded from being included on the landing page in order to avoid redundancy. As another example, items that are not available for consumption, perhaps due to the item not being in inventory or otherwise not being available, may be excluded in order to avoid consumer frustration by appearing to offer items that are not available and to dedicate more space of the landing page to items that are available for consumption.

As yet another example, methods may be employed in order to select search results to display on a landing page that are most likely to result in the consumer consuming relevant items. For instance, various information may be used in order to rank potential search results and select the highest ranked results for inclusion on the landing page. In an embodiment, for search results associated with items for consumption, the popularity of the items among consumers in general or among consumers sharing one or more attributes may be used to rank potential search results. In addition, browsing history of a consumer may be used in order to select or exclude certain results for inclusion on the landing page, such as items the consumer looked at, items the consumer placed in an electronic shopping cart but did not ultimately consume, and the like.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
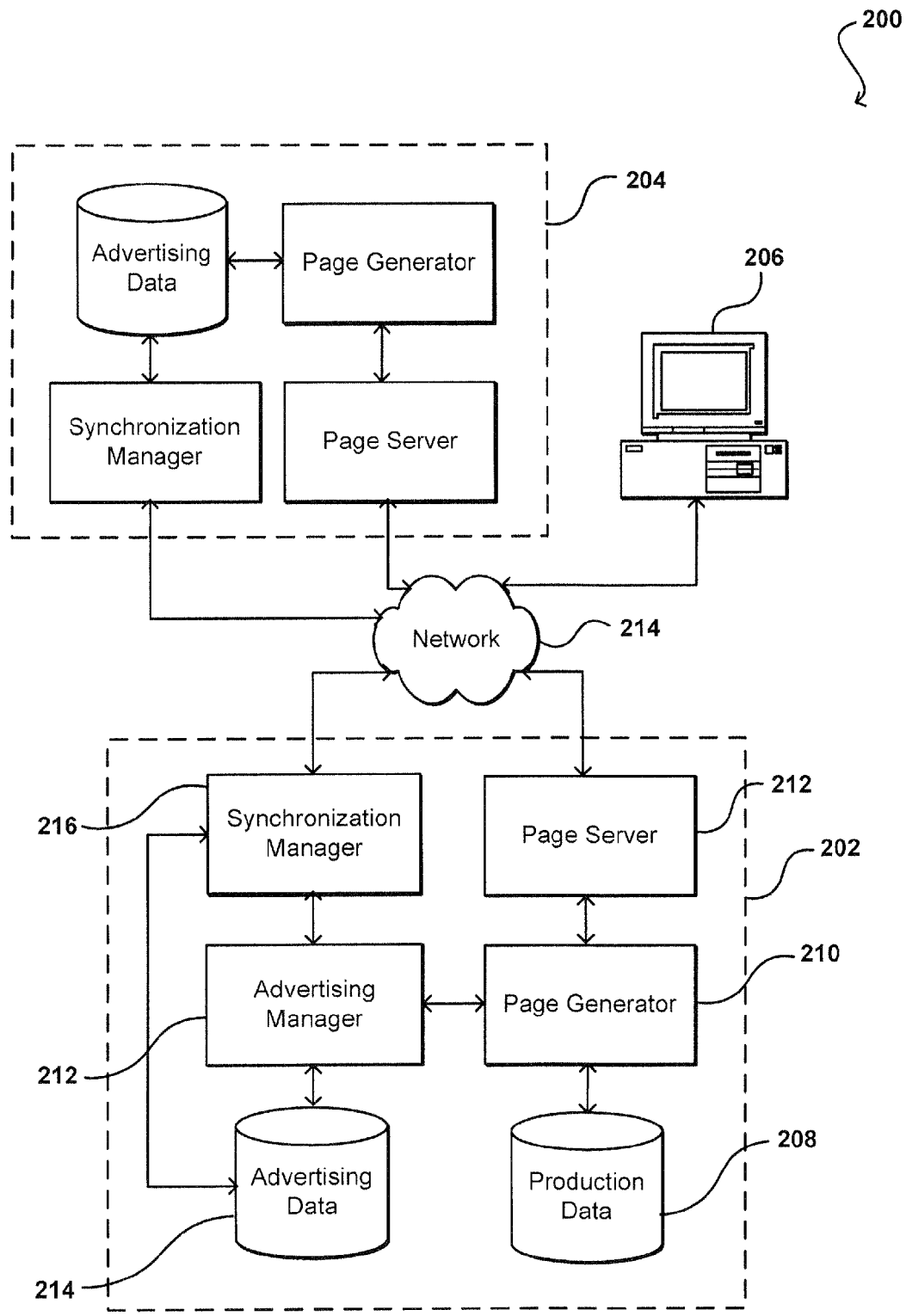
FIG. 2 illustrates components for generating keyword-landing page pairs and synchronizing those pairs with a separate provider that can be used in accordance with one embodiment.

An environment such as that illustrated in FIG. 1 can be useful for a provider, such as an electronic marketplace, wherein the provider wishes to provide relevant information to consumers, such as information relating to products the user may purchase through the electronic marketplace. As discussed above, however, sometimes a provider such as an electronic marketplace might wish to advertise on other sites or with other providers. The electronic environment in such a case might include additional components and/or other arrangements, such as those illustrated in the configuration 200 of FIG. 2. In this example, components for an advertising entity 202 can generate advertising associations such as keyword-landing page pairs to be submitted to components for another provider 204, where a keyword-landing page pair may be a pair consisting of a keyword or combination of keywords with a landing page. It should be understood that while keyword-landing page pairs are used for purposes of explanation, any association of a navigational process with content in an electronic environment can be used with, and benefit from, selections and other processes described with respect to various embodiments.

In this example, the advertising entity generates and serves pages of content available to any appropriate end user 206, and thus can include components such as a production data store 208 that can be used by a page generator 210 to generate pages that can be served by a page server 212 (such as a Web server in a Web-based environment) over a network 214 to the end user 206. Similarly, any other appropriate provider 204 can include page generator and page server components for generating and serving pages of content to a user. While many of the embodiments are described with respect to a Web-based environment, it should be understood that pages are not limited to Web pages, but can include any application page or other interface page that can be displayed or otherwise conveyed to a user.

If the advertising entity 202 wishes to advertise with the provider 204 using sponsored links or other advertisements that direct a user back to a page provided by the advertising entity, then the advertising entity also can include components for determining the landing pages to be associated with the advertisements. While the advertising components in this example are shown to be part of the advertiser's system, it should be understood that these components can be part of a separate system or provided as a third party service, for example. In this example, the advertising entity system includes an advertising manager 212, which as discussed elsewhere herein can encompass, monitor, and/or control a number of different algorithms and components for selecting and deciding upon landing pages. When the advertising manager 212 decides on a landing page to be associated with content on the provider pages, the advertising manager 212 can store the advertising data to an advertising data store 214, which in some embodiments can comprise separate tables in the production data store 208. The advertising entity's system also can include a synchronization manager 216 that can work with a synchronization component of the provider 204 to periodically synchronize the advertising data with the advertising data stored at the provider 204, such that the appropriate landing pages can be designated and updated as desired. When a user 206 views a page of content served by the provider 204, the page can include an advertisement that will direct the user to a page of the advertising entity 202 upon selection by the user. In addition, the provider 204 may provide the advertising entity 202 with information relating to the page of content, such as all or a portion of the content, a search query submitted by the user 206, information relating to one or more items for consumption associated with the page of content, a Uniform Resource Locator (URL) or other identifier of a location of the page of content, and/or other information relevant to the page of content. The page generator 210 of the advertising entity 202 may then use that information in order to generate a page for the user that includes content in accordance with various embodiments of the present disclosure.

As discussed above, the advertisement can include at least one sponsored link, such as a hypertext link displayed on a Web page, for example. Sponsored links also can be displayed on any appropriate interface capable of following a link or similar navigational element to another source of information, and as such the term "link" will be used for purposes of explanation but should not be interpreted as limiting the types of navigational elements that can be used with various embodiments.

As discussed, sponsored links in one example are displayed when a user searches for information in a search engine, and receives a list of search results (referred to herein as a "results page"). There are many aspects to deciding which links are displayed on a results page. For example, advertisers would like to display ads that are relevant to the content of the search results, which might be of interest to the user. For example, a user searching for information on automobiles can, on average, be more likely to purchase a book on automotive repair than a set of steak knives. Thus, the advertiser would prefer to spend the advertising money with respect to those keywords or categories which are "relevant" to the item (e.g., any product or service that can be consumed) being advertised. Further, a category can have many subcategories, and an advertiser might not decide that the advertiser wants to spend money to advertise for an "automotive" category, but would rather advertise for an "automotive books" sub-category.

Once an advertiser decides which keywords, categories, or other aspects for which to advertise, such as by using the advertising manager 212, the advertiser also has to decide how much the advertiser is willing to spend for that advertisement. In many major search engines, there can be several advertisers wishing to advertise for a given keyword, combination of keywords, or category, for example, and at least some of those advertisers are willing to pay a premium for being the most prominently featured advertisement displayed for a given keyword or combination of keywords. In some cases only one advertisement with a link will be displayed, while in other cases there can be a list or set of ads displayed, and an advertiser might pay extra to be displayed closer to the top of a results page, etc. Many search engines and other such providers then allow these advertisers to bid for ad space, with the winning bid being displayed most prominently, and lower bids being displayed less prominently, if at all. An advertiser must then not only decide how much to bid for an advertisement based on projected conversions or revenue for each advertisement, but also must consider the placement of the advertisement on the result page and how much extra the advertiser is willing to pay to be featured more prominently. For example, an advertiser bidding $0.03 per advertisement (e.g., based on number of displayed links or number of followed links, for example) that is being featured third in a list of advertisers might be willing to adjust the bid price to $0.10 per advertisement to instead be featured at the top of the list. While this obviously can cost the advertiser more advertising revenue, the number of extra users following the top link might more than make up for the additional cost. Further, an advertiser might make significantly more money from an advertisement at certain times of the day, week, year, etc., and thus might be willing to spend differently at different times. An advertising manager 212 thus may also be configured to analyze revenue, conversion rates, historical data, and other information that can be stored with the advertising data 214 in order to determine an appropriate price to bid for each ad.

Various other aspects also can be taken into consideration. For example, if an advertiser spends a significant amount of money to be featured with a keyword, combination of keywords, or category, the advertiser would like to display information in addition to the sponsored link that is successful in getting users to want to follow the link. For example, an advertiser could display a generic message with each advertisement, such as the name and slogan of the advertiser, but that message might in general be less effective than a message tailored to the content or keyword(s). In the example where the user is searching for information about automobiles, a message such as "Buy the latest parts for your automobile at discount prices" might be substantially more effective than a generic message "Big Box Store—we offer everything under the sun". An advertiser might also want to tailor the message even further, based on the category or keyword(s). For example, a user searching for information about an automobile that has not yet been placed into the market, such as next year's new hybrid vehicle, might not be interested in seeing a message about buying parts since the car is not yet available. It might be beneficial to instead display a message such as "Get the latest books and magazines about the next generation hybrids". While more narrowly tailored ads can be significantly more successful, however, the number of possible keywords, keyword combinations, categories, and sub-categories is extremely large and there must be some decisions made as to which categories, keywords, and keyword combinations make financial sense to provide with tailored advertisements, and at what level in the subcategories does the advantage of a further tailored message no longer make sense.

Once an advertisement has been placed and a user actually clicks on or otherwise selects a sponsored link, the user is directed to a landing page specified by the advertiser through the advertising manager 212. Considering an example of an online marketplace that offers items in several different categories, a basic approach would simply direct the user to the home page, welcome page, or other such introductory display for the marketplace. It can be more effective, however, to direct the user to a page (herein referred to as a "landing page" as discussed above) offering items or displaying information related to the keyword(s) or category for which the advertiser decided to advertise and the user was searching for information. In the example where a user was searching for information about hybrid automobiles, an address for a landing page could be selected based on the landing page displaying information about automobiles, or more advantageously hybrid automobiles. Again, however, a decision can be made about the level that makes sense for each keyword, keyword combination, or category. Given a marketplace with thousands or even millions of items, and the fact that there can be millions of possible categories and keywords/combination of keywords, it can be desirable to have a system that automatically and accurately selects landing pages and other options for those choices that make financial sense for an advertiser.

While some systems allow for a "generic" link that then can be redirected by the advertiser once the user follows the link and is directed to a site of the advertiser, certain search engines and other providers monitor the landing pages associated with various links for purposes of quality control, etc. A search engine provider may wish to be know exactly where a user is being directed, as a user being directed to an inappropriate page or site can result in that user developing an unfavorable view of the search engine provider. As such, search engine providers can issue quality scores or similar ratings for each advertiser based on the keyword-landing page pair, which can affect the advertiser's ability to have advertisements displayed on the results pages. Further, some search engine providers require a page to be approved before the link is accepted, and a provider might be unwilling to accept a generic link because the provider has no control over where the user is going to finally be redirected. A provider also wants to avoid displaying broken links, etc.

Thus, it can be desirable to develop algorithms for selecting landing pages based upon a variety of factors for selecting an optimal landing page at any given time. For example, if a first source has a high conversion rate for music items but a low conversion rate for clothing items, then suggestions from that source will be more highly ranked for music items than for clothing. If it is a current goal for a period of time to push clothing items for that source, however, the clothing suggestion from that source might be rated more highly. Another source might perform better selling items in certain geographical regions, at certain times of day, to certain demographics or age groups, etc. One source might be a major driver of revenue, and thus can be given a higher priority, while in other cases a new source might be given priority for a period of time in order to help build business for that source. Each source also can be given a trust rating, such as may be based on the number of conversions, complaints, etc., as well as periodic tests to determine whether suggested landing pages actually are appropriate for the suggested keyword or keyword combination. Any of a number of factors can be taken into consideration in order to dynamically select an optimal landing page for any given keyword(s) or category. While it might seem desirable to select landing pages based simply on conversion rate or profit, for example, factors such as appropriateness and consumer confidence dictate that in the long run it can be advantageous to provide the user with results that are of more interest for that particular user.

Figure 3:
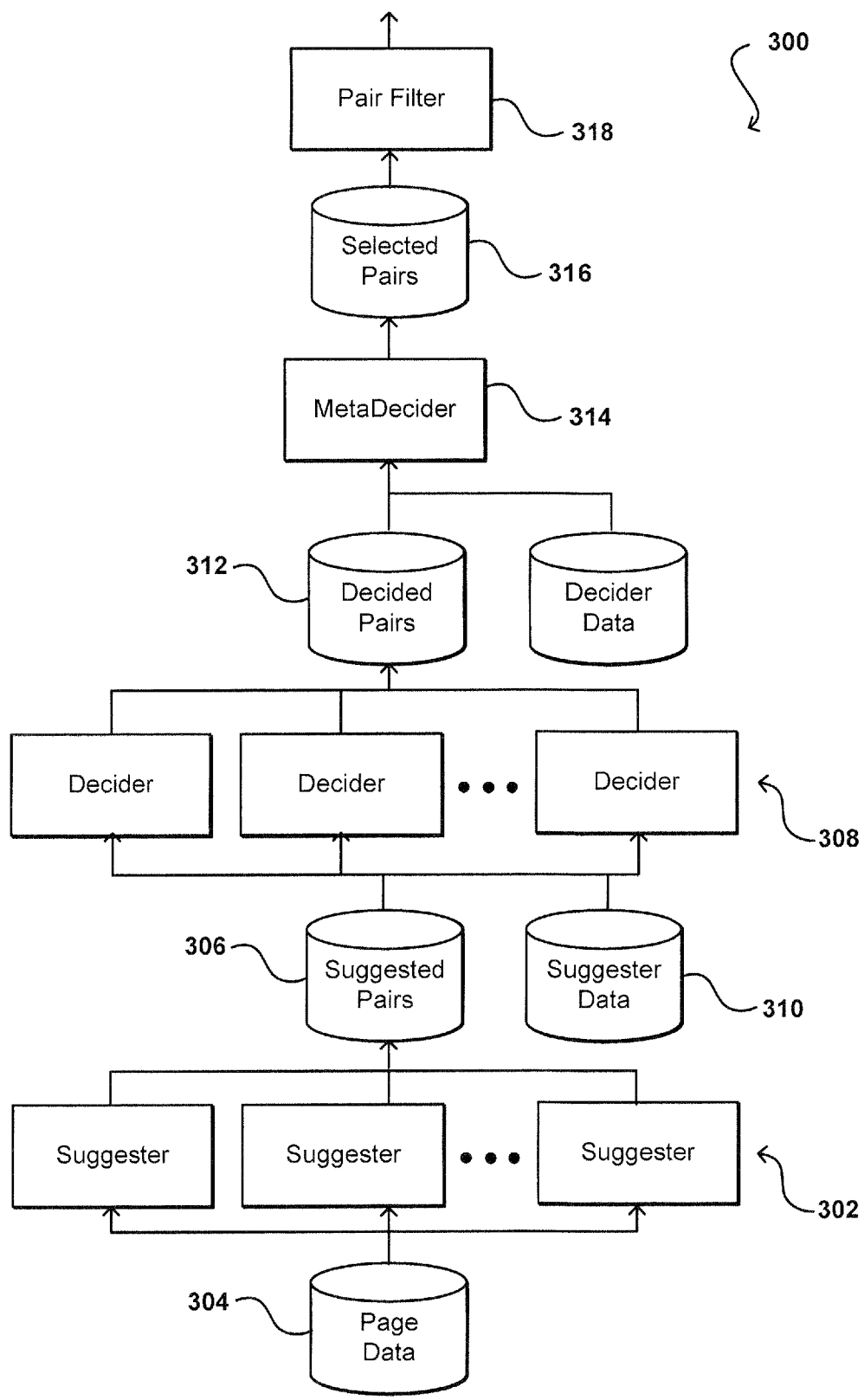
FIG. 3 illustrates components for generating and selecting keyword-landing page pairs that can be used in accordance with one embodiment.

FIG. 3 illustrates a configuration of components 300 that can be used to select an optimal landing page for a given keyword, combination or keywords, or other content in accordance with one embodiment. As will be discussed in more detail later herein, such a system can include a number of processes, applications, modules, or other such components which will collectively be referred to herein as "suggesters" 302. Each suggester can examine or "harvest" information from a data store 304 or other such source (e.g., server logs, flat files, databases, vendor reports, Web-based data services, etc.) containing any information that can be related to, or relevant for, various pages, such as may include page content, production data, historical data, financial data, and other such information to suggest pages to be associated with a given keyword or keyword combination. The landing pages suggested by each suggester can be stored to a data store 306 or other appropriate storage location. These suggestions can be stored as keyword-landing page pairs, or as any other appropriate association. The system also can include a set of processes, applications, modules, services, or other such components which will collectively be referred to herein as "deciders" 308. Each decider can include an algorithm or other decision process for analyzing the suggested landing pages for each keyword/keyword combination and making a decision as to the optimal landing page(s) for that/those keyword(s) based on the respective algorithm. Each algorithm can look to information in a data store 310, such as data relating to each suggester, to select, score, and/or rank at least some of the suggestions, with the ranked suggestions being referred to herein as "decisions." For example, a decider that uses an algorithm that is based at least in part on conversion rate might only analyze suggestions from suggesters that take conversion rate into account. The decider then can process those suggestions using the algorithm to make a selection for the optimal landing page. The optimal keyword-landing page pairs from each decider then can be stored to a data store 312, the optimal result from each decider being referred to herein as a "decided" pair. As should be understood, data stores discussed herein such as the data store for storing the decided pairs can be part of any other data store discussed with respect to this figure or a separate data store.

The system in this example includes a process, application, module, or other such component which will be referred to herein as a "metadecider" 314. A metadecider 314 is configured to analyze data for each decider in combination with any of a number of algorithms, goals, or other such factors, to arbitrate between the decisions (e.g., ranked, keyword(s), landing page, score tuples) from the various deciders and select one or more of the decisions as the optimal keyword-landing page pair at the given time. The metadecider can also perform other tasks, such as to filter out decisions that are invalid, inappropriate, or otherwise should not be selected for any of a number of different reasons. Other filtering tasks can occur earlier in the process, such as where no suggestions and/or decisions are to be made for keyword/keyword combinations that are invalid or forbidden, whereby the keyword(s) can be automatically culled from the list of things to be analyzed. Each optimal keyword-landing page pair can be stored to a table or data store 316 for use in updating the keyword-landing page pairs on any appropriate site, page, etc. As discussed in further detail below, since an advertiser might want to limit the number of landing page changes at any time, a pair filter 318 or similar component can be used to control the number and/or selection of keyword-landing page pairs which are actually updated at any given time. As should be apparent, any of a number of other components and/or configurations can be used as well in various embodiments, as discussed elsewhere herein.

A configuration such as that described with respect to FIG. 3 can be used to perform various aspects relating to sponsored advertisements, suggested links, regular search results, and other such supplemental content. As discussed, each instance of such content in various embodiments can include aspects such as a bid amount, a "creative" portion including text or other informative information to be provided to a user, an associated keyword or keyword combination, and information specifying a landing page or other location or address to be accessed upon an action of a user with respect to the content. Further, each instance (e.g., advertisement) of content might be provided to multiple providers (e.g., different search engines), such that there can be different aspects (e.g., different bid prices or creative elements) for the same advertisement for different providers. A component such as a metadecider also can select the optimal landing page to be used for each advertisement for a keyword or combination of keywords (or other selection element) on each provider.

One approach to selecting an optimal landing page for a keyword or combination of keywords on a provider utilizes components such as those illustrated in FIG. 3, wherein multiple suggesters generate various keyword-landing page pairs, based on any of various factors such as logs, RSS feeds, etc. A set of deciders (e.g., robots) selects from the suggested pairs based on various criteria, such as purchases made as the result of a search. Each decider has its own criteria or approach for selecting keyword-landing page pairs, and can generate a list of best candidates for landing pages for particular keywords based on those criteria. The metadecider then can utilize the suggestions from one or more of these deciders. In some instances, a metadecider considers only the top decision of each decider, and uses a static (e.g., hierarchical) ranking of the deciders to determine which landing page(s) to assign to a keyword or combination of keywords. For example, a suggestion from the oldest or best performing decider is selected if available, and if not then a suggestion from the next oldest or next best performing decider is selected. The tree of deciders is analyzed until a suggestion for the keyword-landing page pair exists. Using such an approach, however, the initial assumptions about effectiveness of each decider to choose the most appropriate landing page are not tested and re-evaluated.

Such a process is not optimal in all cases, however, as a decider with an excellent overall performance across a number of categories might actually perform very poorly in specific categories. For example, a decider that is optimal for high value items might perform very poorly for low value items, where factors such as profit margin may be factored into the decision. Even if a decider can be selected that is optimal for any given category, many keywords/keyword combinations apply to multiple categories, such that simply selecting a decider based on one of the categories might also not produce an optimal result.

Systems and methods in accordance with various embodiments can address at least some of these and other issues with selecting optimal keyword-landing page pairs by taking into consideration the performance or "reputation" of various deciders with respect to at least some of the categories that are determined to apply to a specified keyword or combination of keywords. For example, a keyword/keyword combination might be determined to correspond to results that are in a specific set of categories a specific percentage of the time. A keyword/keyword combination might be determined to correspond to a DVD category 40% of the time, a books category 30% of the time, apparel 20% of the time, and in various other categories 10% of the time. The threshold used to determine whether to consider a category separately can vary, and can be configurable, but can be set to any appropriate value, such as at least 5% or at least 10%. A metadecider component can then utilize one or more algorithms to determine performance or "reputation" of the various deciders in each of these categories, in order to generate a relative performance ranking of the deciders with respect to the category distribution for a particular keyword.

Figure 4A:
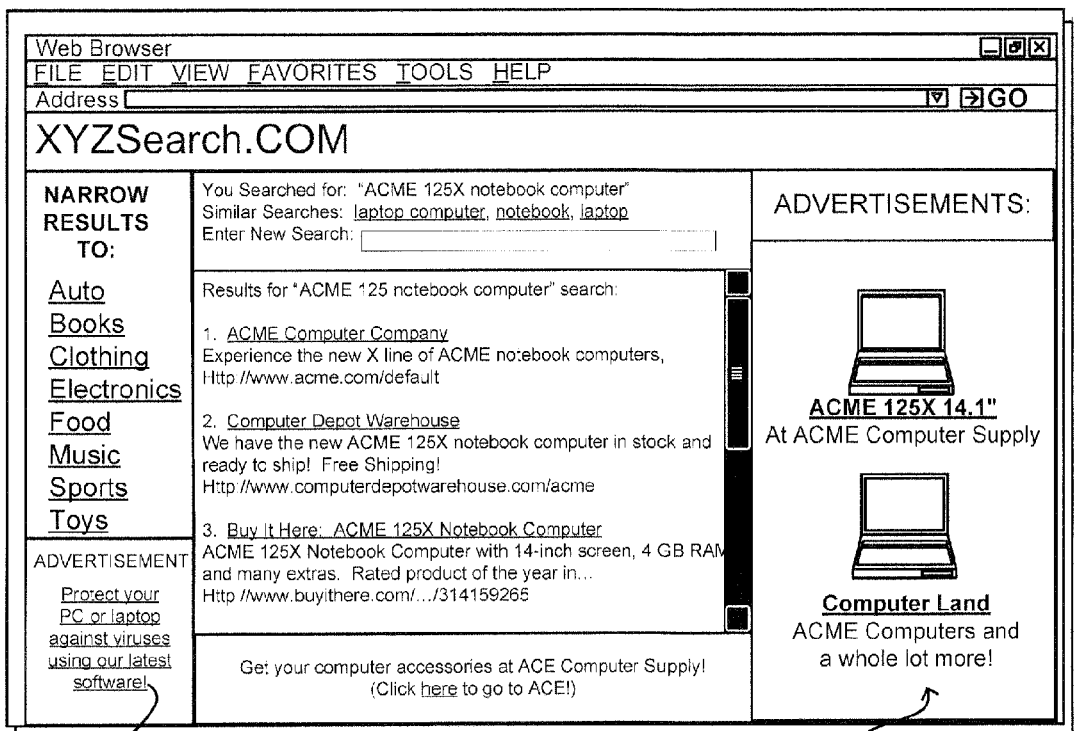
FIG. 4A shows an illustrative example of a search engine interface in accordance with an embodiment.

FIG. 4A shows an illustrative example of a search engine interface, in accordance with an embodiment. In the embodiment shown, a consumer has previously submitted a search query consisting of the words "Acme 125X Notebook Computer," and a search engine has provided results based at least in part upon that query in a search page 400. As shown in the example, the search page 400 may include various components; for example, on the right hand side appear advertisements 402 which may have been selected for presentation to the consumer based upon the search query entered. Likewise, in the lower left corner, appears an advertisement 404 which may be relevant to the search query entered by the consumer. It should be noted that advertisements or other content on a search page, may or may not be relevant to a search query entered by the user and that the figure shows that advertisements shown are merely illustrative examples.

In this particular example, the first three results of a set of search results determined by a search engine are shown prominently in the center of the page although they may be shown in another location. Additional search results may be viewed in various ways, such as by scrolling down to a lower portion of the page 400 and/or by selecting additional pages of search results. In the example shown, the first result shows a link which appears to lead to a home page of the Acme Computer Company, that is, a page directed generally to the company, but not necessarily specifically dedicated to any particular products produced by the company. The second result shows a link to a webpage of an entity entitled "Computer Depot Warehouse" which sells Acme brand computers. The third result shown shows a link to a webpage dedicated to the particular model Acme Notebook Computer whose model number matches terms entered in the search query. Thus, a consumer to whom the search results are presented may select the third search result in order to receive more information about, and/or to purchase, the notebook computer. While the search results are shown in an ordered list, the particular search results shown are for the purposes of illustration and search results responsive to a query may appear in any format that may not include a list and which may be determined by a search engine, and different search engines may provide different search results with different formats.

Figure 4B:
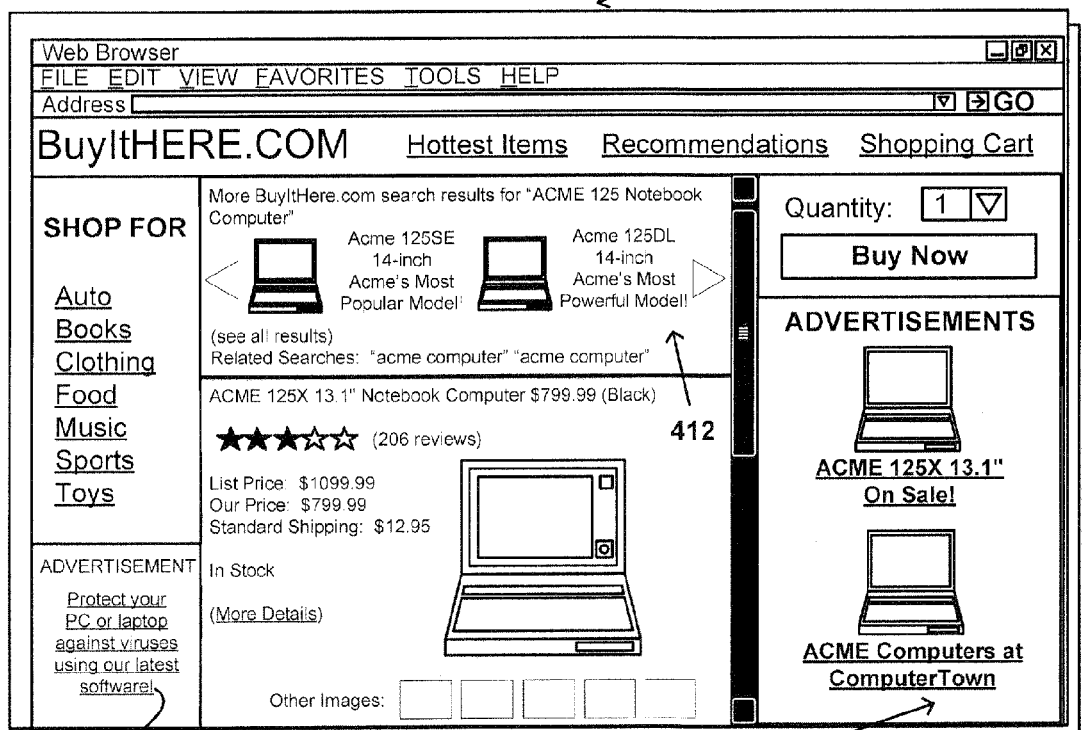
FIG. 4B shows an illustrative example of a landing page for a search result shown on FIG. 4A in accordance with an embodiment.

FIG. 4B shows an illustrative example of a landing page 406 for the third search result shown in FIG. 4A, in accordance with an embodiment. The landing page 406 may also be a landing page in other circumstances as well and not necessarily the landing page of a search result. For instance, the landing page 400 may be a landing page for a "sponsored link" or other advertisement shown along with content which may be search results, articles, and/or other content. Generally the landing page 406 may be any page to which a user navigates from another page or other content. The landing page 406 may be a landing page for any selectable interface element provided to a consumer and with which the consumer may interact in order to navigate to the landing page 400.

As with the page 400 shown in FIG. 4A, the page 406 shown in FIG. 4B includes several components which are shown for the purposes of illustration. As an example, the landing page 406 includes advertisements 408 and an advertisement 410. Prominently displayed in the center of the page 406 are details regarding an Acme 125X notebook computer which is presented so that the consumer may view information, and if so inclined, place an order for the computer through an online marketplace operated in connection with the page 406.

In an embodiment, the landing page 406 includes an additional contents section 412 which in an embodiment is a portion the landing page 406. As shown, the additional contents section 412 is located proximally to a focal area of the landing page 406, where the focal area of the landing page includes content corresponding to the landing page. For instance, landing page 406 shown as an example in the drawings includes a central area dedicated to information about an ACME 125X computer as a focal area. In this example shown, the additional contents section 412 is a rectangular area of the page 406 located proximal to and above this central area of the page 406 dedicated to the notebook computer associated with the third search result of FIG. 4A. In this manner, because the additional contents section 412 is near the focus of the consumer's attention, the consumer can see additional items related to the landing page without having to navigate in or away from the landing page. While the example in FIG. 4B shows the focal area of the landing page 406 centrally located, the focal area may be in other places on a landing page or on another page presented in connection with a landing page. However, it should be noted that the additional contents section 412 may be in another section of the page 406 such as along the side, on the bottom or in another location. Additionally, the initial content section 412 may not occupy any of the page 406 but may be presented in alternate ways. For example, the additional contents section 412 may be presented as superimposed upon the page 406 such that a consumer may select the additional content section 412 in order to make the section more prominent or may cause the additional content section 412 to be removed. The additional contents section 412 may also be a separate page, such as a pop-up page that appears when the consumer navigates to the page 400. The additional contents section may include audio, video, text, and/or features, which may be interactive.

In the embodiment shown, the additional contents section 412 includes information from search results relevant to the query the consumer entered on the page 400 of FIG. 4A. The search results shown in FIG. 4B, that are presented in the additional contents section 412, may be from the same search engine that processed the search query and presented results in connection with the page 400 of FIG. 4A or may be from a different search engine or may be advertisements from another system, such as a system that generates a plurality of landing pages for keywords, such as a system incorporating one or more components of FIG. 3. The search results may be generated dynamically or may be retrieved from a data store. In an embodiment, the search results shown in the additional contents section 412 of FIG. 4B, are from a product search engine where a product search engine provides search results dedicated to consumer products. Further, in an embodiment, the search engine used to provide search results for the additional contents section 412 is dedicated to provide results related to items for consumption (such as consumer products), which may be offered by an entity operating a website that includes the page 406. In this manner, if the consumer was not searching for the particular model of computer shown prominently in the center of the page 406, additional items which may be relevant to the consumer are displayed to the consumer such that the consumer may easily locate the items, select the items in order to receive more information and/or purchase or otherwise consume the items.

As shown in the drawing, additional features may be provided on the page 406. For instance, as shown in the drawing, the additional content section 412 may include one or more navigational arrows or other elements such that, a user may select one of the navigational arrows in order to view additional search results that are not currently displayed in the additional content section 412. As another example, as shown in the drawing, an interface element for viewing all the search results may be provided in connection with the additional content section 412. In the example of FIG. 4B, a user may select the text "see all results" and the user may navigate to a page that more prominently displays search results identified for the additional content section. In this manner, a user may view a set of relevant search results in order to obtain more information about and/or consume one or more items for consumption associated with the search results. Other features, such as "related searches" that provide search results in connection with alternate search queries that may be more relevant, may be included as well.

Figure 5:
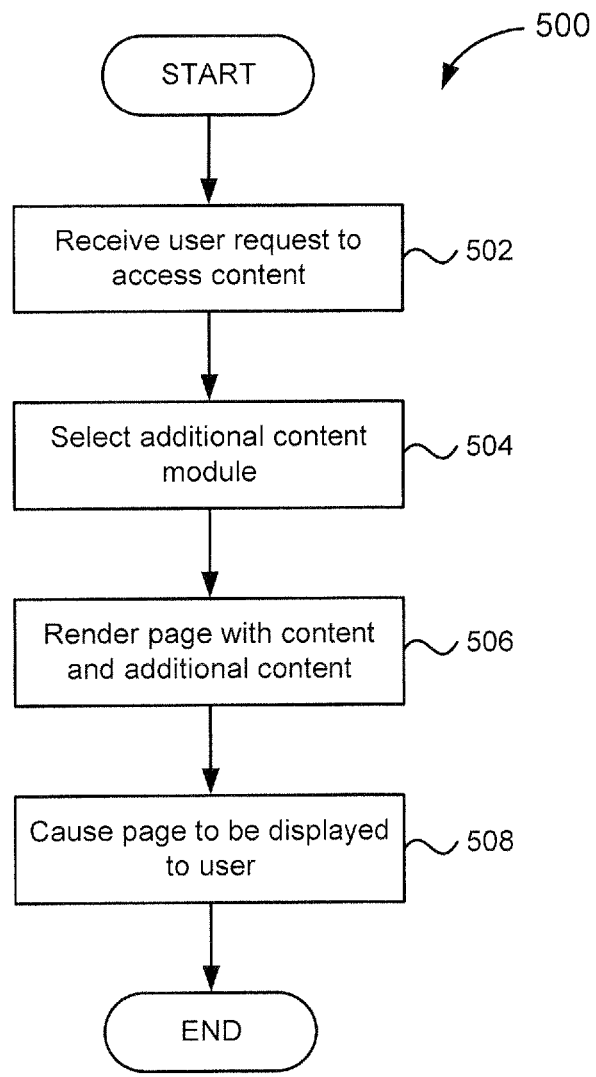
FIG. 5 shows steps of a method for providing contents in accordance with an embodiment.

FIG. 5 shows a method 500 for providing content in accordance with an embodiment. For example, the method 500 may be used in order to provide the page 406 shown in FIG. 4B or generally to provide any page produced in accordance with the present disclosure. The method shown in FIG. 5 (and/or any method, combinations of methods, or variation thereof) may be performed under the control of one or more computer systems that are configured with executable instructions, which may be embodied on a computer-readable storage medium. Generally, the method 500 proceeds by receiving a request for content and determining what additional content, if any, to include with a response to the request. In an embodiment at a request receipt step 502, a request to access content is received. The request to access content may be received in a variety of ways. For example, continuing with the illustrative examples of FIGS. 4A and 4B, a request to access content may be received from a consumer computing device, such as a personal or notebook computer, personal digital assistant (PDA), mobile phone, electronic book reader, and the like, when a consumer selects a link or other element causing navigation to a landing page, such as the third search result shown in FIG. 4A. However, the request may be received in various other ways for example, a request may be received from a computer that enters an electronic address of a landing page into an address bar of an internet browser. In another embodiment, the request to receive content is generated automatically based upon consumer browsing activity.

At a content module selection step 504, a selection of an additional content module is made, where an additional content module comprises a set of executable instructions for providing content additional to the content requested in a specified manner, such as in the additional content section 412 shown in FIG. 4B. As an another example, an additional content module may include instructions for displaying alternate search queries and/or for displaying alternate items for consumption, which may be based at least in part on browsing activity of other consumers. In the illustrative example of FIG. 4B, upon receiving the request to access the landing page 406 at a location specified in a hyperlink of the third search result of FIG. 4A, a web server receiving the request may determine whether to include the additional content section 412 or to include other content such as advertisements or such as third party advertisements or other content. Alternatively, in some instances, a determination to not include an additional content module may be made. For instance, search results may be identified for inclusion as additional content and a determination whether to include the search results may be made based on characteristics of the identified results. For example, if the number of identified search results do not exceed a minimum threshold, which may be predetermined or which may depend on the dimensions of the area in which additional content may be displayed, the identified search results may not be included as additional content. As another example, one or more algorithms may be used to decide whether to include search results as additional content. If search results are categorized into categories, then search results may be provided as additional content only in instances when certain criteria are met with regards to the number of search results belonging to a single category. In this manner, search results that are more likely to be relevant to the user may be provided as additional content. Other algorithms may be used in addition or as an alternative.

At a rendering step 506, a page is rendered that includes requested content and the additional content. For instance, looking to the illustrative example of FIG. 4B, the page 406 has been rendered to include content relating to the Acme 125X Notebook Computer in the center of the page as well as the additional content section 412. As discussed, the page may be rendered in various ways. In an embodiment, rendering the page includes creating an HTML or other electronic document that provides instructions to a browser executing on a consumer computing device for displaying the content and additional content.

At a display step 508, the page having the content and the additional content is caused to be displayed to the user. In an embodiment, the instructions for displaying the page, which may be encoded in an HTML document, are sent over a communications network such as the Internet to a computing device utilized by the consumer. The instructions may include text, pictures and/or video or may include instructions for displaying content locally stored on the device of the consumer.

Figure 6:
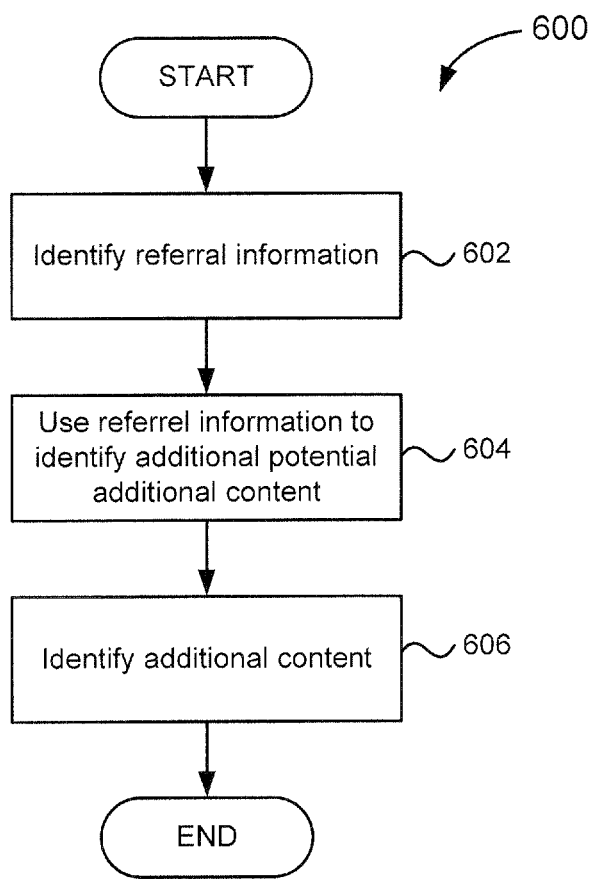
FIG. 6 shows steps of a method for determining contents in accordance with an embodiment.

FIG. 6 shows a method 600 for identifying additional content in accordance with an embodiment. The method 600 may be used, for example, to provide search results in the additional content section 412 of FIG. 4B and may be performed in order to identify additional content while performing the method described in connection with FIG. 5, or variations thereof. Generally, in an embodiment, the method 600 proceeds by using information about a consumer's preceding browsing history in order to select potential additional content, where the browsing history may include information about one or more search queries submitted by the consumer and/or on the consumer's behalf. A search query may be derived from the information. Additional content for display, in an embodiment, is then selected from the potential additional content. In an embodiment, at a referral information identification step 602 a referral information is identified. In an embodiment, referral information is or includes a URL of a page from which a consumer selected a link in order to navigate to the landing page. Alternatively or in addition, referral information may include other information such as any information from or about the page from which a consumer navigated to a landing page, information regarding browsing history of the consumer and/or other information.

Various techniques may be used to obtain the referral information. In an embodiment, an HTTP_REFERER variable (or analogous variable) in a hypertext preprocessor (PHP), Active Server Pages (ASP), or other script is used to identify the URL from which a consumer navigated to the landing page, although other techniques may be used. As another example, an operator of a referring page may send referral information directly to an operator of the landing page, such as in response to a request from the operator of the landing page, or in response to a user selecting a sponsored link or other advertisement. A request from the operator may include information identifying a consumer to enable the operator of the referring page to retrieve information about the consumer, such as from a server log, and send the information to the operator of the landing page.

At a potential additional content identification step 604 potential additional content is identified based at least in part on the referral information. In an embodiment, identifying additional content includes submitting a search query based at least in part on information from a referring page, such as one or more keywords entered by the consumer as a search query from a page previously visited by the consumer. In this example, potential additional content may include search results returned by a search engine executing the search query. Identifying additional content may include requesting and/or receiving landing pages related to the referral from a system such as a system similar to the one discussed in connection with FIG. 3.

At an additional content identification step 606, in an embodiment, additional content is identified from the potential additional content. Identification of the additional content may be performed in various ways. For example, in an embodiment where the potential additional content includes search results, identification of the additional content may include identifying a subset of the search results. Various criteria may be used in order to identify additional content. Using the search results example, the top search results as determined from a ranking of the search results may be selected. The number of top search results may depend on the amount of space available for additional content. In addition, certain results may be excluded such as, for example, if the landing page is dedicated to an item for consumption, that item for consumption may be excluded from search results in order to avoid providing a consumer an option to navigate to the same page already displayed. In addition, popularity values related to search results may also be used as may be any method of selecting a subset of search results, where the popularity values may be associated with items for consumption corresponding to the search results. Generally, any suitable set of rules may be applied to the potential additional content in order to identify the additional content. Further, while the method 600 shows two separate steps, the additional content may be identified directly without first identifying potential additional content. Also, identifying potential additional content and additional content may be performed as one single step. As an example, in an embodiment, a web service may be used to respond to requests for additional content, which may be from a web server. In response to a request, the web service may provide additional content for initial display as well as other potential additional content which may be displayed based at least in part on consumer browsing activity.

Figure 7:
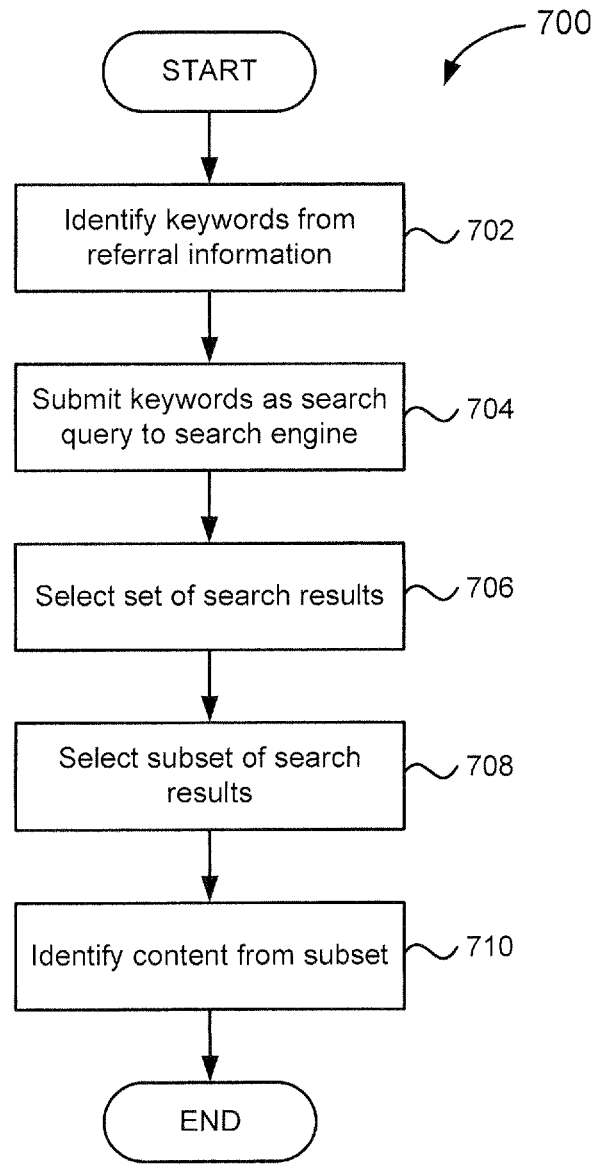
FIG. 7 shows steps of a method for selecting contents in accordance with an embodiment.

FIG. 7 shows a method 700 of identifying additional content which may be used for example as the potential additional content identification step 604 and the additional content identification step 606 shown in connection with FIG. 6, in accordance with an embodiment, although the method may be used in other instances. In an embodiment, keywords are identified from referral information at a referral information identification step 702. While the present disclosure speaks of identifying keywords, it should be understood that at times a single keyword may be identified, such as when a user submits a search query consisting of a single word. As an example of identifying keywords, many search engines use URLs to encode submitted search terms. Google Inc., for example, encodes a search for speaker cables in a URL that includes the following:
google.com/search?q=speaker+cables&rls=com.microsoft: en-us:IE-SearchBox&ie=UTF-8&oe=UTF-8&sourceid=ie7&rlz=1I7DKUS
Specifically, the search terms appear between "q=" and an ampersand immediately following "cables" and are separated by a plus sign. Other information relating to a computing environment used by the consumer follows the ampersand. Thus, a computer system, such as a web server, may be programmed to, upon detection of the domain "google.com," locate the content between "q=" and the next ampersand. The computer system may additionally be programmed to locate other information in a search query, such as quotation marks, plus signs, minus signs, and other information input by the consumer in order to direct how the search is performed in accordance with a particular search engine. The computing logic used to extract the search terms and grammar to direct how a search should be performed, as discussed, may be different for different referring websites. Accordingly, in an embodiment, if the referral information includes a URL of a search engine that includes search terms in the URL, the keywords from the URL are be extracted. Identifying the referral information may include identifying a domain of a referring page and applying a set of rules applicable to the domain to a referring URL in order to extract the keywords.

As discussed, identifying keywords from the referral information may include identifying a search query that has been submitted by a user or is otherwise associated with content viewed by the user. Identifying the keywords may include identifying a search query (such as a search query submitted by the user) and modifying the search query according to a set of rules. For example, certain words (such as words that may result in too many dissimilar search results) may be disregarded. As another example, the syntax of a search query may be modified for use in a search engine different from that to which the search query was previously submitted. For instance, the word "AND" may be added to a search query for use in a search engine that, unless otherwise directed, searches for any (but not necessarily all) of the keywords in a search query. Likewise, terms may be deleted, and punctuation may be deleted and/or modified. As yet another example, identifying a search query may include specifying parameters for the search query. For instance, if items for consumption are categorized into categories, and a requested landing page corresponds to an item for consumption in a particular category, a parameter for the search query may specify that results for the search query should be from the particular category or from a related category, such as from a parent category in a hierarchical categorization scheme. Thus, in an embodiment, if a requested landing page corresponds to a book for sale, a parameter may be specified for the search query that specifies that results should include only books. A search engine dedicated to books may be utilized to locate information corresponding to other books or a more general search engine, as may a book index of a more general search engine or a query may be modified to indicate that results should be limited to books. Similarly, if a requested landing page corresponds to a portable music player, a parameter for the search query may specify that results should be portable music players, electronics, and/or accessories for portable music players. Generally, any parameters may be specified for the search query and the parameters may be set according to the search engine or engines being used to locate information additional content.

At a keyword submission step 704, the identified keywords are submitted as a search query to a search engine in accordance with an embodiment. As discussed, the keywords may be submitted to a search engine dedicated to items for consumption offered by or on behalf of an entity operating a website which includes the landing page. Other variations are also possible. For instance, if a referring page is associated with a search engine, the keywords may be submitted to the same search engine with additional keywords and/or conditions. As an example, if the landing page is xyz.com, the keywords may be submitted to the search engine with the condition that search results be limited to pages associated with xyz.com, such as by including "site:xyz.com" in a query at google.com, or that the search results be limited to search results of a specific type or types, such as search results dedicated to items for consumption, images, video, and/or other categories of search results. In another embodiment, identified keywords may be submitted to one or more search engines to locate items for consumption by other entities. In this example, an operator of the landing page may offer others' items for consumption and generate revenue through commissions or other methods. Generally, the keyword submission step 704 may include submission to any suitable search engine with or without conditions for how the search engine should process the keywords.

At a search result selection step 706, in an embodiment, a set of search results is selected in accordance with an embodiment. For example, the set of searches returned by the search engine or a subset thereof may be selected. If not all the search results are selected, a certain number selected from the top of a ranking of the search results may be selected and/or one or more criteria may be used in order to determine which search results are selected. For instance, in an embodiment where the search engine provides search results corresponding to items for consumption, only search results corresponding to items for consumption that are available may be selected. If the landing page corresponds to an item for consumption, then a search result dedicated to the same item for consumption may be excluded, as may different versions of the item, such as items that only vary in color or some other characteristic. Criteria may also relate to sales data, popularity of corresponding items for consumption, compatibility with an item for consumption corresponding to the landing page, and others, and may be used to rank the selected search results and/or a set of potential search results from which the selected search results are selected. Further, in an embodiment, items for consumption are organized into categories and only search results corresponding to items in the same category as an item corresponding to the landing page. If the categories are hierarchically organized, then only search results corresponding to items in the same category or a sub-category of the item for consumption corresponding to the landing page may be provided. For example, if the landing page is dedicated to a particular portable music player, search results may be limited to portable music players, or sub-categories of portable music players, such as accessories for portable music players.

In an embodiment, at a subset selection step 708, a subset of the set of search results is identified. Identifying the subset may include a particular number of the selected search results based at least in part on a ranking of the search results, where the ranking may be provided by the search engine that provided the results. The number of search results selected for the subset may be based at least in part on the space available to display the search results, such as the size of an additional content section, as described above. Further, one or more criteria may be used in order to select the subset, such as any of the criteria described above. In addition, any criteria used for excluding or ranking search results may be applied during the search results selection step 706, during the subset selection step 708, or both.

At a content identification step 710, in an embodiment, content from the subset of search results is identified. Identifying content may include identifying information for display in an additional content section, such as described above. For instance, if the search results correspond to items for consumption, information from a data record associated with each item for consumption, such as a picture of the item and an item name for the item, may be identified. Other content may be identified as well. For example, additional content that is not initially displayed may be identified for display upon one or more specified consumer actions, such as selection of an associated search result, a mouseover with respect to an associated search result, and the like.

One or more additional steps may be taken in addition to or instead of steps discussed in connection with the methods described above. For example, information may be identified for inclusion in an additional content section instead of or in addition to the additional content described above, such as search results. For example, in an embodiment, information independent of a search query submitted by a consumer or otherwise associated with content accessed by a consumer may be identified and included in addition to or instead of additional content discussed above, such as search results. As an example, an organization providing a landing page may include information corresponding to items for consumption that are independent of items of consumption identified through execution of a search query associated with consumer-accessed content. The information may correspond, for instance, to items the entity has determined to market specifically to the consumer, or to consumers in general. The information may correspond to items previously viewed by the consumer, items placed by the consumer on a publicly accessible (such as through a website) list of items for consumption desired by the consumer, items on such a publicly accessible list of items desired by others, such as by people associated with or determined to be associated with the consumer, items commonly placed on such a list by a group of consumers, and the like. Other examples of information that may be included in an additional contents section may include information about items for consumption that have been consumed by other consumers who have submitted the same or similar search queries and/or who have requested the same landing page. Generally, any process for determining additional content in addition to the additional content discussed in the preceding paragraphs may be used. Additionally, determining additional content may include identifying the consumer that requested the landing page, such as from a cookie sent by a browser of a computing device of the consumer or other mechanism, and utilizing information specific to the consumer. Thus, in the example of additional content including information associated with a publicly accessible list created by the consumer, the list may be identified based at least in part on the identity of the consumer.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or be configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under the control of one or more computer systems configured with executable instructions,
   receiving a request to access a landing page, the request caused by the selection of an element of a result page from a first search engine provider, the result page displaying search results for a first search query;
   causing two or more additional search queries to be executed by two or more additional search engine providers to identify two or more additional sets of search results, the two or more additional search queries each corresponding to one or more keywords of the first search query;
   selecting search results from the two or more additional sets of search results, the search results being selected based at least on part on previous purchases of products or services made by users in response to a prior search for a product or service; and
   causing the landing page to be displayed with the selected search results from the two or more additional sets of search results.

2. The computer-implemented method of claim 1, further comprising:
   accessing a set of suggested landing pages, each of the set of suggested landing pages being associated with one or more keywords;
   identifying a subset of the set of suggested landing pages, the subset identified by comparing the one or more keywords of the first search query to the one or more keywords associated with each of the set of suggested landing pages.

3. The computer-implemented method of claim 2, wherein the association between each of the set of suggested landing pages and the one or more keywords is based at least in part on one or more of previous search queries, web page content, geographical data, or conversion data.

4. The computer-implemented method of claim 2, further comprising:
   providing the subset of suggested landing pages to a plurality of deciders, each decider associated with a single landing page selection criteria;
   analyzing, by each of the plurality of deciders, the subset of suggested landing pages according to the landing page selection criteria associated with the decider performing the analysis;
   receiving a ranked list of the subset of suggested landing pages from at least two of the plurality of deciders, each ranked list being generated by the decider analyzing the subset of suggested landing pages according to the landing page selection criteria associated with the decider.

5. The computer-implemented method of claim 4, further comprising:
   assigning each of the deciders with a respective ranking value;
   identifying the top-ranked landing page from the highest-ranked decider providing a ranked list of the subset of suggested landing pages; and
   selecting the top-ranked landing page as the landing page to be displayed.

6. The computer-implemented method of claim 5, wherein the respective ranking value of each of the deciders is based at least in part on a relative performance ranking of the deciders with respect to a category distribution for a particular keyword.

7. The computer-implemented method of claim 5, wherein the respective ranking value of each of the deciders is based at least in part on previous purchases made in response to a prior search.

8. The method of claim 5, wherein the selecting further comprises:

comparing the identified top-ranked landing page to a first selection criteria;

determining that the identified top-ranked landing page does not meet the first selection criteria; and selecting the top-ranked landing page from the next-highest-ranked decider as the landing page to be displayed.

9. The computer-implemented method of claim 1, wherein a ranking value of each of the two or more additional search engine providers is based at least on part on previous purchases made in response to a prior search.

10. The computer-implemented method of claim 1, further comprising:

obtaining, from the request, an identifier used to identify the first search engine provider as a source of the result page.

11. The computer-implemented method of claim 1, wherein the request to access a landing page is for a product or service associated with at least one of a product category or a service category, and the two or more additional sets of search results correspond to other products or other services associated with the at least one of a product category or a service category.

12. The computer-implemented method of claim 1, wherein at least a portion of the search results for the first search query correspond to items for consumption, and further comprising:

limiting the selection of search results from the two or more additional sets of search results only to search results corresponding to items for consumption.

13. The computer-implemented method of claim 1, wherein the landing page corresponds to a first item for consumption, and further comprising:

excluding, from the selected search results, any search results associated with the first item.

14. A system for causing display of content, comprising:

at least one server having a processor and a memory including instructions that, when executed on the processor, cause the processor to:

receive a request to access a landing page, the request caused by the selection of an element of a result page from a first search engine provider, the result page displaying search results for a first search query;

cause two or more additional search queries to be executed by two or more additional search engine providers to identify two or more additional sets of search results, the two or more additional search queries each corresponding to one or more keywords of the first search query;

select search results from the two or more additional sets of search results, the search results being selected based at least on part on previous purchases of products or services made by users in response to a prior search for a product or service; and cause the landing page to be displayed with the selected search results from the two or more additional sets of search results.

15. The system of claim 14, wherein a respective ranking value of each of the two or more additional search engine providers is based at least on part on previous purchases made in response to a prior search.

16. The system of claim 14, further comprising a data store that stores information corresponding to products or services offered for consumption in exchange for value and wherein the search results are from the data store.

17. The system of claim 14, wherein each of the search results has a ranking based at least in part on one or more criteria and the search results are selected based upon the ranking.

18. The system of claim 14, wherein the server is further configured to:

identify second information independent of the search results; and cause the display of the web page with the second information.

19. A non-transitory computer-readable storage medium including instructions that, when executed by at least one processor of a computing device, cause the computing device to:

receive a request to access a landing page, the request caused by the selection of an element of a result page from a first search engine provider, the result page displaying search results for a first search query;

cause two or more additional search queries to be executed by two or more additional search engine providers to identify two or more additional sets of search results, the two or more additional search queries each corresponding to one or more keywords of the first search query;

select search results from the two or more additional sets of search results, the search results being selected based at least on part on previous purchases of products or services made by users in response to a prior search for a product or service; and cause the landing page to be displayed with the selected search results from the two or more additional sets of search results.

20. The non-transitory computer-readable storage medium of claim 19, wherein a respective ranking value of each of the two or more additional search engine providers is based at least on part on previous purchases made in response to a prior search.

* * * * *